United States Patent
Mallya (10) Patent No.: US 10,282,281 B2
(45) Date of Patent: May 7, 2019

(54) SOFTWARE TESTING PLATFORM AND METHOD

(71) Applicant: SYNTEL, INC., Troy, MI (US)

(72) Inventor: Srinath Mallya, Tamil Nadu (IN)

(73) Assignee: Syntel, Inc., Troy, MI (US)

( * ) Notice: Subject to any disclaimer, the term of this patent is extended or adjusted under 35 U.S.C. 154(b) by 514 days.

(21) Appl. No.: 14/634,084

(22) Filed: Feb. 27, 2015

(65) Prior Publication Data

US 2015/0178182 A1    Jun. 25, 2015

Related U.S. Application Data

(63) Continuation of application No. 13/646,994, filed on Oct. 8, 2012, now abandoned.

(60) Provisional application No. 61/544,346, filed on Oct. 7, 2011.

(51) Int. Cl.
   *G06F 11/36*    (2006.01)

(52) U.S. Cl.
   CPC ...... *G06F 11/3672* (2013.01); *G06F 11/3664* (2013.01); *G06F 11/3676* (2013.01); *G06F 11/3684* (2013.01)

(58) Field of Classification Search
   CPC ............. G06F 11/3672; G06F 11/3688; G06F 11/3692; G06F 11/3684; G06F 11/3676
   USPC .................................. 717/124, 134
   See application file for complete search history.

(56) References Cited

U.S. PATENT DOCUMENTS

| | | | |
|---|---|---|---|
| 5,146,460 A | 9/1992 | Ackerman et al. | |
| 5,513,315 A | 4/1996 | Tierney et al. | |
| 7,392,149 B2 | 6/2008 | Bonilla | |
| 7,747,987 B1* | 6/2010 | Akarte | G06F 11/3612 702/179 |
| 8,001,468 B2 | 8/2011 | Khaladkar et al. | |
| 8,271,949 B2 | 9/2012 | Bernardini et al. | |
| 8,276,123 B1* | 9/2012 | Deng | G06F 11/3688 714/37 |
| 8,510,602 B2 | 8/2013 | Chen | |
| 8,566,777 B2 | 10/2013 | Chaar et al. | |
| 2003/0212924 A1* | 11/2003 | Avvari | G06F 11/3676 714/38.13 |
| 2004/0143819 A1 | 7/2004 | Cheng et al. | |
| 2008/0103797 A1* | 5/2008 | Holden | G06Q 10/101 705/300 |
| 2008/0256529 A1* | 10/2008 | Chaar | G06F 8/20 717/174 |

(Continued)

OTHER PUBLICATIONS

Oracle Enterprise Manager, Testing Accelerators for Web Services, Sep. 30, 2011 (Year: 2011).*

*Primary Examiner* — Lewis A Bullock, Jr.
*Assistant Examiner* — Tina Huynh
(74) *Attorney, Agent, or Firm* — Dykema Gossett PLLC (57) ABSTRACT

An integrated test accelerator platform that ensures discrete testing solutions to be integrated to work together in harmony, and resources (people, data, and process) allocated to these solutions to collaborate and work in tandem. The platform provides a flexible way of interconnecting accelerators (i.e., automation framework, regression optimization, risk based testing, test data management, pair-wise testing, and metrics) using coupling and decoupling mechanisms. The accelerators are configurable and customizable for any unique test execution workflow scenario. This provides solutions for the end-to-end test process.

17 Claims, 4 Drawing Sheets

(56) References Cited

U.S. PATENT DOCUMENTS

| | | | |
|---|---|---|---|
| 2008/0282124 A1* | 11/2008 | Esposito | G06F 11/3672 714/736 |
| 2009/0007078 A1 | 1/2009 | Hoyek et al. | |
| 2009/0077422 A1* | 3/2009 | Khaladkar | G06F 11/3684 714/33 |
| 2009/0192761 A1* | 7/2009 | Pearl | G06F 11/3414 702/182 |
| 2012/0159443 A1* | 6/2012 | Kamenz | G06F 11/368 717/124 |
| 2012/0296687 A1 | 11/2012 | Satyanarayana et al. | |

* cited by examiner

SOFTWARE TESTING PLATFORM AND METHOD

RELATED APPLICATIONS

This application is a continuation of U.S. patent application Ser. No. 13/646,994, filed Oct. 8, 2012 entitled "SOFTWARE TESTING PLATFORM AND METHOD", which is a non-provisional of U.S. Provisional Application Ser. No. 61/544,346, filed Oct. 7, 2011 entitled "SOFTWARE TESTING PLATFORM AND METHOD", now expired, all of which are incorporated herein by reference in their entirety.

TECHNICAL FIELD

This invention relates generally to computerized software testing systems; more particularly, the invention relates to a computerized system on which test accelerators may be mounted upon and leveraged in a customized manner.

BACKGROUND AND SUMMARY

Traditional testing solutions operate in isolation and lack the ability to combine and inter-operate the different aspects of the testing process, which means that individual elements, such as regression optimization, risk based testing, test data management, test automation, performance testing, and metrics, are addressed separately. There is no inherent software platform or support for integrating, sequencing, or chaining these in an integrated way, as per the needs of a specific solution.

Some embodiments of the present invention include a platform that fuses unique solution elements, orchestrating them to deliver benefits that surpass typical results derived from implementing traditional elements individually. The solution elements include:

1) Regression optimizer that helps in selection of test cases more scientifically for a release minimizing improper or incorrect test case selection;
2) Risk based testing to help with better insight and quantification of risk associated with deployment of an application into production;
3) Test data management to prevent an incorrect or insufficient test bed, with the ability to optimize test data combinations using advanced techniques like pair-wise testing;
4) Test automation which is business process driven with dynamic script generation for a target vendor automation tool with ability to integrate with vendor test management tools; and
5) Metrics tool to collate data from disparate sources, convert to relevant information and present charts and graphs.

This platform provides a flexible way of interconnecting the above accelerators using both tight coupling within solution elements to increase efficiency and loose coupling across accelerators that minimizes both inter-accelerator dependency and maintenance costs. As a result, the accelerators can be easily configured and customized for a specific test execution workflow scenario.

In an embodiment, a computer system for testing an application under test includes at least one processor, a memory element coupled to the processor, the memory storing instructions to program the processor with logic including: a plurality of testing accelerators configured to perform one or more tests on an application under test to determine whether an error exists, wherein each of the plurality of testing accelerators are independently selectable as enabled or disabled for a particular environment; a risk based testing module configured to quantify a risk associated with deployment of the application under test into production; a test data management module configured to prevent an insufficient test bed; a test automation module configured to generate one or more scripts for a target vendor automation tool; and a metrics module configured to collate test data regarding the application under test.

In an embodiment, the plurality of testing accelerators includes a history based regression testing module.

Additional features and advantages of the invention will become apparent to those skilled in the art upon consideration of the following detailed description of the illustrated embodiment exemplifying the best mode of carrying out the invention as presently perceived. It is intended that all such additional features and advantages be included within this description and be within the scope of the invention.

BRIEF DESCRIPTION OF DRAWINGS

The present disclosure will be described hereafter with reference to the attached drawings which are given as non-limiting examples only, in which.

Corresponding reference characters indicate corresponding parts throughout the several views. The components in the Figures are not necessarily to scale, emphasis instead being placed upon illustrating the principles of the invention. The exemplification set out herein illustrates embodiments of the invention, and such exemplification is not to be construed as limiting the scope of the invention in any manner.

DETAILED DESCRIPTION OF THE DRAWINGS

Figure 1:
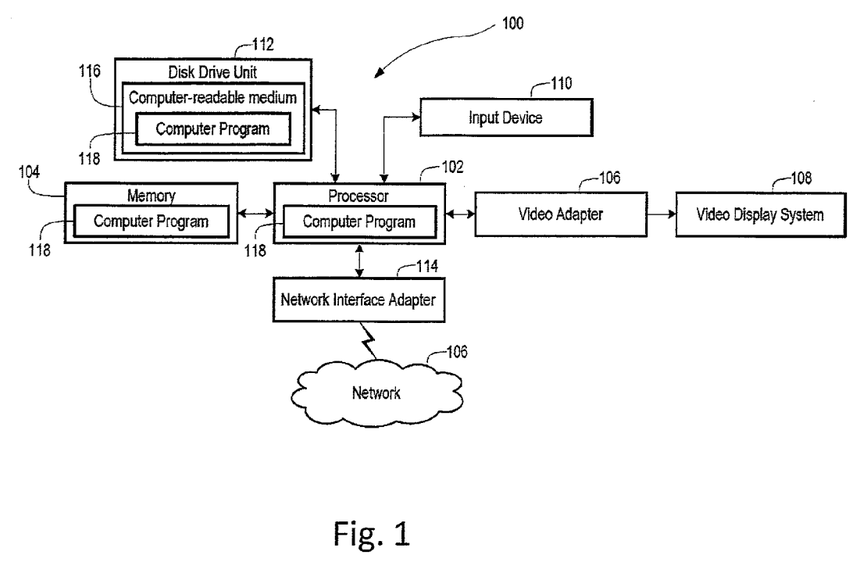
FIG. 1 is a block diagram of an example computer on which the testing platform could execute according to an embodiment of the present invention

In one aspect, the present invention is a computer-based testing platform. FIG. 1 illustrates a diagrammatic representation of a computer in the example form of a machine 100 that may be programmed with a set of instructions to perform any one or more of the methods discussed herein. The set of instructions could be a computer program stored locally on the device that, when executed, causes the device to perform one or more of the methods discussed herein. In some embodiments, at least a portion of the set of instructions could be stored remotely such that, when executed, causes the device to perform one or more of the methods discussed herein. In embodiments where the computer program is locally stored, data may be retrieved from local storage or from a remote location via a network. Embodiments are contemplated in which the computer may operate in the capacity of a server or a client machine in a server-client network environment, or as a peer machine in a peer-to-peer (or distributed) network environment. Accordingly, the terms "computer" and "server" shall also be taken to include any collection of machines that individually or jointly execute a set (or multiple sets) of instructions to perform any one or more of the methods discussed herein.

The machine 100 illustrated in FIG. 1 includes a processor 102 (e.g., a central processing unit ("CPU")), a memory 104, a video adapter 106 that drives a video display system 108 (e.g., a liquid crystal display ("LCD") or a cathode ray tube ("CRT")), an input device 110 (e.g., a keyboard, mouse, touch screen display, etc.) for the user to interact with the program, a disk drive unit 112, and a network interface adapter 114. Note that various embodiments will not always include all of these peripheral devices.

The disk drive unit 112 includes a computer-readable medium 116 on which is stored one or more sets of computer instructions and data structures embodying or utilized by a computer program 118 performing one or more of the methods described herein. The computer instructions and data structures may also reside, completely or at least partially, within the memory 104 and/or within the processor 102 during execution thereof by the machine 100; accordingly, the memory 104 and the processor 102 also constitute computer-readable media. Embodiments are contemplated in which the computer program 118 may be transmitted or received over a network 120 via the network interface device 114 utilizing any one of a number of transfer protocols including but not limited to the hypertext transfer protocol ("HTTP") and file transfer protocol ("FTP").

While the computer-readable medium 116 is shown in the example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing a set of instructions for execution by the machine and that cause the machine to perform any one or more of the methods described herein, or that is capable of storing data structures utilized by or associated with such a set of instructions. The term "computer-readable medium" shall accordingly be taken to include, but not be limited to, solid-state memories, optical media, flash memory, and magnetic media.

Optimal Test Selection and Execution

Figure 2:
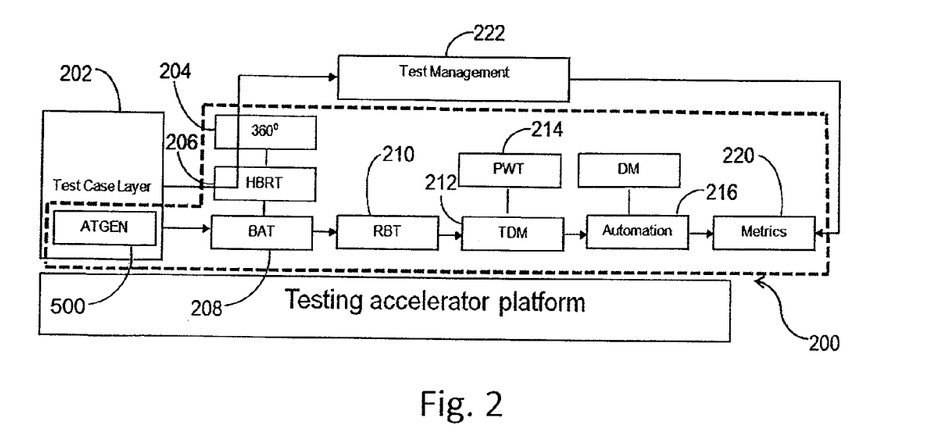
FIG. 2 is a block diagram showing an example architecture for the testing platform according to an embodiment of the invention.

FIG. 2 illustrates a testing accelerator platform 200 according to one embodiment. This could provide an end-to-end test management tool assisting in all forms and ways of managing and also accelerating the testing effort in any organization in an integrated manner. In one embodiment, the platform 200 includes a plurality of testing accelerators that may coexist to be used to obtain a desired function or outcome. In some cases, the various accelerators support data flow therebetween. In some cases, bi-directional data exchange may be provided between the platform and third party test management tools, such as HP Quality Center, which helps minimize the effort of creating requirements, test cases, defects, etc. Additionally, this increases the time savings to avail the effectiveness of the data portability and facilitates automation results to be exported to HP Quality Center along with their step-by-step snapshots. Embodiments are contemplated in which the various accelerators could be integrated in a functional manner. Typically, the core test accelerators are loosely or lightly coupled in such a way the accelerators are very much less dependent on each other, providing a flexible way of interconnecting the accelerators with one or more of the following non-exhaustive list of features:

a) Maintenance of testing accelerators is simple since they are loosely-coupled;
b) No interdependency among test accelerators within the platform
c) Easy break-down of accelerators into definable elements
d) Simplified trouble shooting since problems or issues can be isolated The plurality of testing accelerators is configurable and customizable for any unique test execution workflow scenario. Additional accelerators could be added depending on the client's testing needs. In some cases, the existing accelerators may be enabled/disabled depending on the testing needs of the client. The workflow within the accelerators may be flexible to be configured based on the client's needs. In addition to the existing accelerators, third party tools for test management and test execution may be configured per the needs of the client.

In the embodiment shown, the testing accelerator platform 200 includes a test case layer 202 configured to select test cases. The scientific test case selection technique aims to identify and execute only those test cases that are relevant to the release, identified through a combination of techniques—360 degree traceability and test case execution history. The 360 degree traceability module 204 establishes a three-way relationship between business processes, program code configuration items (CI in Configuration management system) and test cases. While a two-way traceability between requirements and test assets or CIs and test assets is standard in traditional systems, a three-way linking with a learning system that establishes and continuously updates inter-relationships to better determine dependencies and casual effects is a unique capability of this accelerator.

In addition, in the embodiment shown, the platform 200 includes a history based regression testing module ("HBRT") 206 with a defect-history-based approach. This provides another set of test cases that have a high probability of failure. The unified set of identified test cases is more likely to unearth defects. In some embodiments, the HBRT module 206 may provide one or more of the following functionality:

Ability to create and maintain defects mapped to test cases/steps for each release for a test case.
Ability to automatically navigate through all the test case and assign the selection probability to a test case for a release based on intelligence from the test case execution results history from past releases. The selection probability factor for a particular test case for the current release is arrived at by using exponentially weighted moving average of all the test cases in the past releases.
Ability to eliminate optional test cases and copy just the test cases selected by HBRTS technique.

Lastly, as shown, critical business processes are validated by executing a set of business assurance test cases identified by the Business Assurance Testing ("BAT") module 208. The user may be given the option of selecting a particular tool for his execution. He just needs to use the right set of objects and the appropriate tool adapter for execution. Static scripts can be generated for a similar scenario with multiple tools.

In some embodiments, the 360 degree traceability is made possible with one or more of the following features:

Integration with a vendor test management tool like HP Quality Center ("QC") by Hewlett Packard of Palo Alto, Calif. to pull the master set of test cases for performing RO.

Integration with RBT to prioritize the test cases based on risk.

Ability to automatically select the right set of test cases based on the impacted configuration items ("CIs") achieved through development and testing traceability.

Ability to automatically select the business assurance test cases based on the criticality of the business process.

Flexible to support any levels of hierarchy in testing traceability.

Configuration items can be mapped to any levels in the testing hierarchy. For example, it could be at the requirements level or it could be at a test scenario level.

Ability to maintain different version of the same test case based on the releases.

Report to show the actual number of test cases to be tested for each release. This report could also show the count of test cases picked using each of the following techniques: 360 degree, BAT, HBRTS.

Risk Based Testing

In the example shown, the testing accelerator platform 200 brings in a structured approach based on quantified risk values using a Risk Based Testing module 210. While weightage driven risk based testing is used traditionally, the accelerator is unique in providing a platform that enables multiple stakeholders to collaborate in quantifying the risk, strategizing, and prioritizing for execution using a What-If analysis. For example, The RBT module 210 may perform coverage analysis (What-If analysis) where a percentage value or absolute value could be specified to calculate the risk coverage based on the number of test cases count, testing effort or risk factor. Another unique feature is that this can flexibly connect upstream to the output of regression optimization and downstream to automation accelerator. The coverage analysis aids the test manager the following non-exhaustive items:

planning test execution by calculating the effort required and amount of risk covered and reprioritizing test cases for execution on the basis of risk coverage by knowing residual and contained risk.

A progress monitor provides a snapshot of the test execution progress in terms of contained and residual risk along with other RBT parameters vis-à-vis testing effort and test case count. In some cases, the RBT module 210 may provide progressive prioritization, which provides the flexibility of configuring and applying the RBT technique at any level of the hierarchy built using various testing artifacts of a project. This nature of the RBT enables the user to do progressive prioritization of test cases across various phases of testing life cycle.

Test Data Management

Test data availability is very critical during test execution to reduce defects due to wrong data and downtime due to non availability of data. Also, establishing traceability from requirements to data and data to defects becomes very critical to reproduce defects and retest them. The testing accelerator platform 200 reduces the time spent by business analysts and data analysts in creating and maintaining data. The Test Data Management ("TDM") module 212 focuses on tool-based creation of the desired volume of data. The TDM accelerator is unique in that it enables traceability and maintains versions and history of usage, resulting in high data reusability rates. In appropriate scenarios, a pair wise testing ("PWT") module 214 may be provided. The tool-enabled pair wise testing technique could be deployed, for example, to optimize test data. In some cases, a code coverage tool may be provided that is integrated with the test data management module 212 and/or automation module 216. For example, the code coverage tool may provide a snapshot of missed lines of code and/or test conditions in the application under test which helps the testing team in optimizing the test cases and/or test data.

Automation Framework

The testing accelerator platform 200 enables business-driven automated testing. For example, the platform 200 may include an automation module 216 that focuses on independent task management between business analysts and automation engineers in order to model automation in line with the requirements of a system. The objective is to minimize maintenance effort and incorporate re-usability through automation business components. Since the platform 200 is generally tool-agnostic, it can work with any standard vendor tool. In essence, once a comprehensive base of business components is created, anyone with an understanding of the scenario to be automated can create automation scenarios that could be executed directly without writing code. Building automation-ready scripts for test cases at a design stage without an automation tool reduces dependencies. The object parser utility learns all the objects from the Application Under Test ("AUT") screen and may house it on to a global template, which is the object layer for the testing system framework.

In some embodiments, the object stack, parser and the scenario can be reused for generation of Performance scripts, which could be used for benchmarking, tuning, testing, etc. For example, the automation of scripts provides the ability to generating static scripts at run time (execution) as against traditional script design and development. This is a highly advanced process for automation. The also allows building automation-ready scripts for test cases at a design stage without an automation tool that reduces dependency on a vendor tool at design time. Users can use the automation tool for execution and object learning alone. Embodiments are contemplated in which the automation of scripts could be provided with features such as follows:

Generates fully functional performance test scripts compatible with a vendor tool like HP LoadRunner's Web (Click & Script) protocol;

Reuses the existing object stack, object parser and scenario information available in the existing functional automation framework to build the scripts;

Generates the test scripts that support web applications developed using Java and .Net technologies;

Test Scripts are generated with the following enhancements:
Parameterization
Transaction Points
Think Time
Comments;

Eliminates correlation overhead by using the Web (Click and Script) protocol for script generation, since the scripts are object based and not request based like Web (HTTP/HTML). This also eases script maintenance;

Instantly generates a huge volume of test data for the parameterized objects by leveraging the test data management ("TDM") tool;

Generates test scripts in a machine where Loadrunner-VUGen is not present;

Generates Test Scripts without the application access; and

Eliminates the necessity of a skilled resource with LR technical knowledge to generate test scripts.

In some embodiments, the platform 200 may include defect management ("DM") module 218. The DM module may be used, for example, to cover the entire testing life cycle starting from test planning, design, execution, reporting, etc. Accordingly, after test execution using the automation framework, the failed test cases will be reported in the DM module for assessment.

In some cases, the automation module 216 includes a framework called Web Service Test Automation Framework (WSTAF) that lets automation engineers test functionality of the web services at component level. Test engineers with an understanding of web service functionality can create automation test artifacts. In some cases, the WSTAF may provide the following functionality:

- Generating skeleton XML messages along with respective web service endpoint and service information
- Capturing the field/tag level information of individual web service for configuring test data
- Generating test data combinations by leveraging Test Data Management (TDM) component and binding the test data with skeleton XML messages automatically
- Validating the target web services along with database validation
- Generating test execution summary and detailed reports In some embodiments, the automation module 216 can facilitate cross browser test execution of the created automation testing scenarios. The module 216 presents the user with options of selecting a browser or a combination of browsers to select and run test automation scenarios for web applications. For example, the automation module could provide one or more of the following features:

- Cross Browser test execution of automated testing scenarios of web applications under a single platform
- Customized reporting of automated steps along with detailed screenshots
- Designing test automation scenarios on one browser and running the same on multiple browsers
- Functionality and compatibility tests of web applications on different browsers Metrics Management Through testing accelerator platform 200, a comprehensive and flexible platform to select relevant metrics may be provided, which is represented by the metrics module 220. These metrics align to organizational goals and satisfy the informational needs of multitiered stakeholders. The platform's metrics management component links to and maps existing data sources and aids collation and reporting. The platform provides role-based access to users to customize and view metrics at operational, tactical and strategic levels covering all phases of the SDLC. For example, this information could be accessed using the test management module 222. In some embodiments, one or more of the following non-exhaustive list of features could be provided in conjunction with the metrics module 220:

- Robust framework for capturing the critical metrics aligned to every stakeholder in an organization;
- Role based access to user;
- Visibility into areas where costs are high and can be curtailed;
- Help projects align with organization goals;
- Give "Early Warning" signs and sets path for corrective action;
- Set quality baselines and enables defect prevention measures;
- Provide a mechanism for objective decision making.

Figure 3:
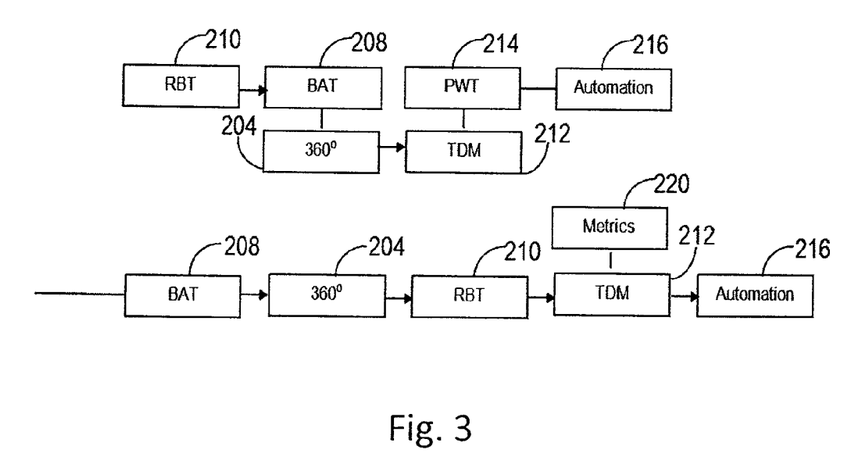
FIG. 3 is a block diagram showing examples of component workflow according to an embodiment of the invention.

FIG. 3 shows examples of component workflow and how various components or modules can be chained or customized for any unique test execution or workflow scenarios. The modules in the platform may be pluggable to cater to a variety of test execution scenarios.

Assessment Methodology

In one embodiment, the first step in the test consultancy methodology is to map the business goals of the organization to various test process areas. The client will be briefed on the mapping exercise and joint participation in this mapping exercise is recommended.

Once the goals are mapped to the process areas, the process area maturity is assessed objectively. After understanding client needs, sample projects are selected to study and understand the processes, challenges, strengths and opportunities in the existing system. A well defined set of parameters and guidelines may be provided to enable the consultant to objectively assess the maturity in a particular process area.

Based on the inputs gathered from the auditees, the process consultant can match the verification points/evidences and arrives at a rating for the particular process area. For example, the process area may be rated on a scale of three as follows:

Basic
Advanced
Optimized

For each process area this exercise is conducted and rating arrived at. Finally the scores of all testing process areas are consolidated and the rating for the testing organization is arrived at. On understanding the existing system thoroughly and where the system stands in terms of a maturity scoring, the process consultant arrives at solutions and a roadmap. Care is taken while developing the roadmap so that the day-to-day operations of the organization are not affected due to improvement initiatives.

The improvements suggested will be in the areas of enhancing the quality, cost reduction, improving the time to market, process maturity, continuous improvement plan, predictability or scalability, depending on the challenges faced by the organization, business plans in hand, and the budget constraints faced by the client.

Typically, key performance indicators are identified and tracked to measure the benefits accruing from implementation of the solutions. Based on the key performance indicators the processes are fine tuned to ensure smooth transition.

Figure 4:
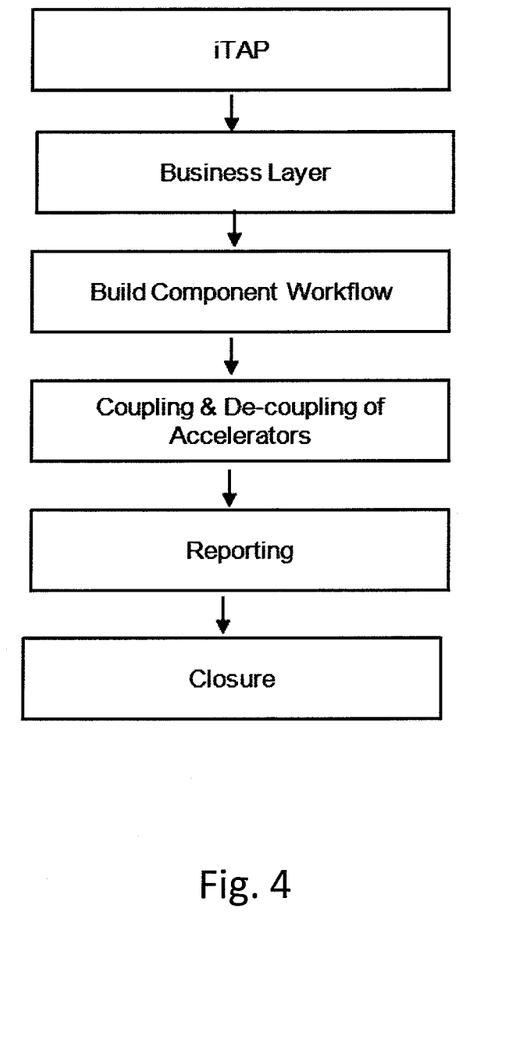
FIG. 4 is a flow chart showing an example work flow according to an embodiment of the present invention.

FIG. 4 shows an example execution workflow for the testing accelerator platform 200. In this example, a business layer of the application under test ("AUT") is setup. (Block 400). This setup could include, for example, identifying core features, business processes, test scenarios, and business components. A component workflow may then be built that is specific to the needs of the client, as described above with respect to FIG. 3. (Block 402) Accelerators may be implemented as defined in the component workflow. (Block 404) After the execution of the test, a status may be reported. (Block 406) The iteration for the release may then be closed. (Block 408)

Figure 5:
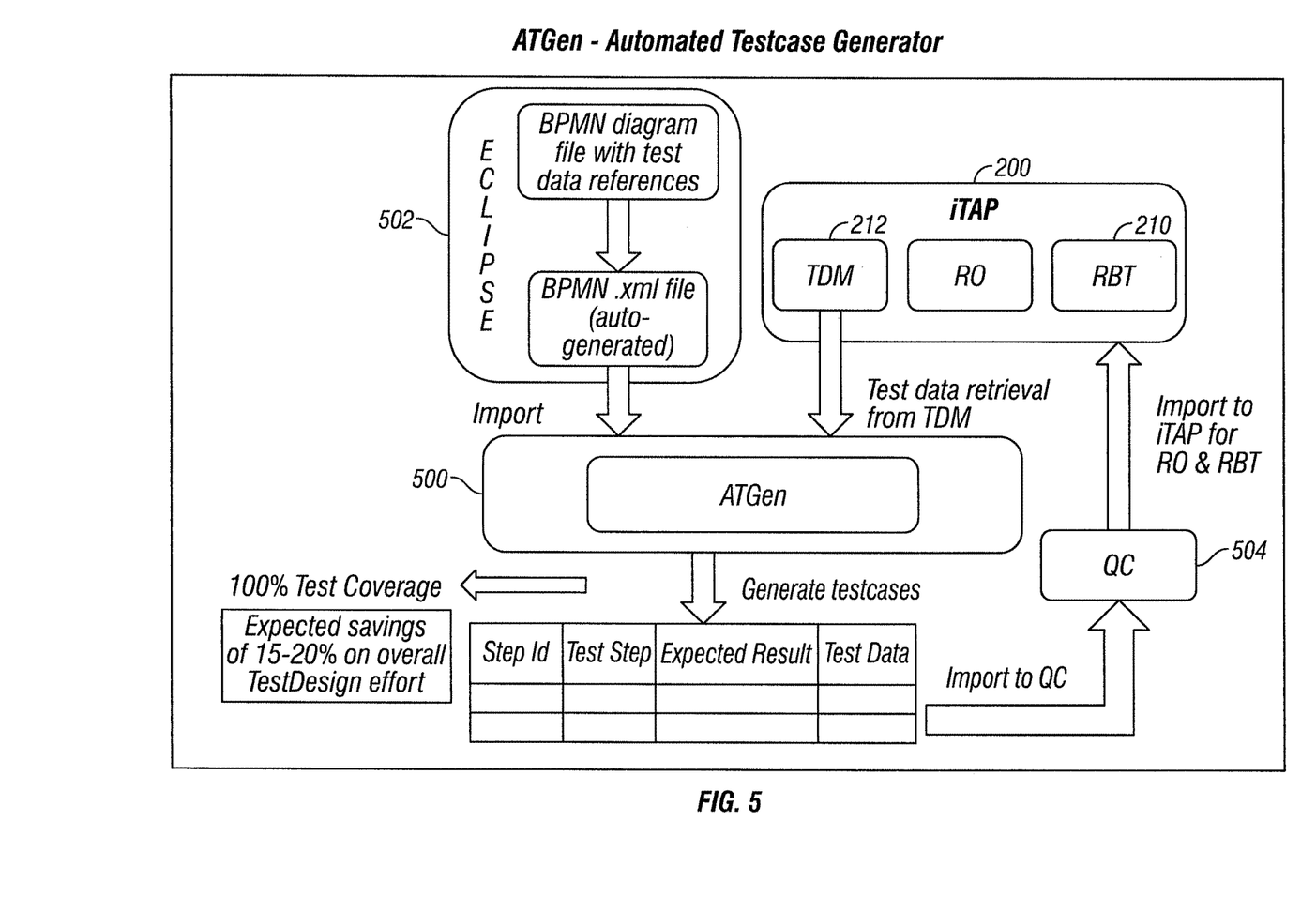
FIG. 5 is a block diagram showing an example architecture for an automated test case generator according to an embodiment of the invention.

FIG. 5 shows an example embodiment in which the system includes an automated test case generator (ATGen) 500. This Automated test case generator tool is built on .net technology which operates on a concept Model based testing ("MBT"). ATGen 500 generates test cases by traversing through each and every business process modeling notation ("BPMN") node/vertex of the diagram thereby ensuring 100% path coverage. In the example shown in FIG. 5, business process scenarios are depicted using BPMN (Business Processing Modeling Notation) 502 in Eclipse IDE by Eclipse Foundation of Ontario, Canada. BPMN uses a concept known as "swimlanes" to help partition and organize business process activities. As and when a diagram is drawn, .xml file gets generated in concurrence which is then fed as an input to ATGen 502. In this example, test data references are specified in the diagram, for which the actual test data is maintained and managed inside the test data management module 212. For example, the .xml version of the diagram file could be fed as an input into ATGen 500 by doing a manual upload. Subsequent to this, ATGen 500 connects to the TDM module 212 for test data retrieval and displays actual test data along with the generated test steps. In the example shown, ATGen 500 integrates with HP Quality Center ("QC") 504 for hosting the generated test cases.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

What is claimed is:

1. A computer system for testing an application under test, the computer system comprising:
   at least one processor;
   a memory element coupled to the processor, wherein the memory element includes a computer readable medium, the memory element storing instructions to program the processor with logic including:
      a plurality of independently selectable testing accelerators, each of the testing accelerators containing submodules comprising test script for test execution configured to perform one or more tests on a current release of an application under test using selected test case to determine whether an error exists, wherein each of the plurality of testing accelerators are independently selectable as enabled or disabled for a particular test environment, wherein said plurality of testing accelerators includes:
         a history based regression testing module wherein the history based regression testing module creates a second set of test cases based on test case execution results for each release of the application under test, said history based regression testing module further assigns a selection probability factor to one of said test cases based on the test case execution results history from past releases, said history based regression testing module being further configured to select one of said test cases according to said assigned selection probability factor and further configured to assign said selection probability factor to one of said test cases;
      a test data management module, wherein the test data management module creates test data for use by at least the selected test case and maintains versions and history of usage of the test data;
      a test automation module, wherein the test automation module automatically uses existing object stack, object parser, and scenario information to generate one or more scripts for at least the selected test case; and
      a metrics module, wherein the metrics module links to and maps to the test data created by the test data management module.

2. The computer system of claim 1, wherein two or more of the plurality of testing accelerators exchange data therebetween.

3. The computer system of claim 1, wherein one or more of the plurality of testing accelerators exchange data with a third party testing management tool.

4. The computer system of claim 1, further comprising a risk based testing module configured to quantify a risk associated with deployment of the application under test into production,
   wherein the risk based testing module performs a coverage analysis to determine a value specifying risk coverage.

5. The computer system of claim 4, wherein the coverage analysis is based on one or more of a test cases count, testing effort or risk factor.

6. The computer system of claim 4, wherein the risk based testing module is configured to reprioritize test cases for execution based on risk coverage.

7. The computer system of claim 4, wherein the risk based testing module is configured to prioritize test execution based on a calculation of an effort required and a risk factor.

8. The computer system of claim 1, wherein the metrics module is configured to present a progress monitor that provides test execution progress in terms of contained and residual risk.

9. The computer system of claim 1, further comprising a code coverage tool integrated with at least one of the test data management module and the test automation module and configured to provide a snapshot of one of missed lines of computer code or test conditions in the application under test.

10. The computer system of claim 1, wherein the plurality of testing accelerators includes a 360 degree traceability module configured to establish a three-way relationship between the at least one test case, program code configuration items, and business processes.

11. The computer system of claim 1, wherein the metrics module is configured to provide real-time generation of metrics for a test case during execution.

12. The computer system of claim 11, wherein the metrics module is accessible based on role-based access to a user.

13. The computer system of claim 1, wherein the test automation module is configured to generate static scripts at run time.

14. The computer system of claim 13, wherein the test automation module is configured to generate test scripts including one or more of parameterization, transaction points and comments.

15. The computer system of claim 1, wherein a test case generator is configured to generate test cases by traversing through a business process modeling notation diagram.

16. The computer system of claim 1, wherein the test automation module is configured to present selection of one or more browsers to run test automation scenarios for web applications.

17. The computer system of claim 1, wherein the test automation module includes a web service test automation framework configured to test functionality of web services at a component level.

* * * * *